United States Patent
Ouimette

(10) Patent No.: US 12,534,908 B2
(45) Date of Patent: *Jan. 27, 2026

(54) SYSTEM AND METHOD FOR PROTECTING STRUCTURES

(71) Applicant: Donald Ouimette, Bluffton, SC (US)

(72) Inventor: Donald Ouimette, Bluffton, SC (US)

( * ) Notice: Subject to any disclaimer, the term of this patent is extended or adjusted under 35 U.S.C. 154(b) by 258 days.

This patent is subject to a terminal disclaimer.

(21) Appl. No.: 18/456,133

(22) Filed: Aug. 25, 2023

(65) Prior Publication Data

US 2023/0399843 A1    Dec. 14, 2023

Related U.S. Application Data

(63) Continuation of application No. 16/775,972, filed on Jan. 29, 2020, now Pat. No. 11,885,121.

(60) Provisional application No. 62/798,730, filed on Jan. 30, 2019.

(51) Int. Cl.
| | |
|---|---|
| *E04B 1/94* | (2006.01) |
| *E04B 1/38* | (2006.01) |
| *E04B 1/66* | (2006.01) |

(52) U.S. Cl.
CPC .............. *E04B 1/942* (2013.01); *E04B 1/388* (2023.08); *E04B 1/665* (2013.01); *E04B 1/948* (2013.01); *E04B 2001/389* (2023.08); *E04B 2001/949* (2013.01); *E04B 2103/04* (2013.01)

(58) Field of Classification Search
CPC ... E06B 5/12; E06B 5/18; E04B 1/948; E04B 1/665; E04B 1/942; E04B 1/40
See application file for complete search history.

(56) References Cited

U.S. PATENT DOCUMENTS

| | | | |
|---|---|---|---|
| 3,355,851 A | 12/1967 | Imbertson et al. | |
| 4,425,744 A | 1/1984 | Villareal | |
| 4,458,456 A | 7/1984 | Battle | |
| 4,488,386 A | 12/1984 | Thompson | |
| 4,693,042 A | 9/1987 | Villarreal | |
| 5,702,147 A * | 12/1997 | Essig | B60J 7/104 160/395 |
| 5,743,484 A | 4/1998 | Baskett | |
| 5,984,577 A * | 11/1999 | Strong | E02B 3/108 405/91 |
| 6,029,405 A * | 2/2000 | Wood | E04H 3/14 52/2.23 |
| 6,176,050 B1 | 1/2001 | Gower | |
| 6,179,521 B1 * | 1/2001 | Muramatsu | E02B 7/005 405/91 |
| 6,412,540 B2 | 7/2002 | Hendee | |
| 6,460,299 B1 | 10/2002 | Burrow | |

(Continued)

FOREIGN PATENT DOCUMENTS

GB         2452726 A     3/2009

*Primary Examiner* — Paola Agudelo
(74) *Attorney, Agent, or Firm* — Perilla Knox & Hildebrandt LLP

(57) ABSTRACT

Systems and methods are disclosed for protecting structures. In example embodiments, one or more waterproof barrier panels are sealed to one or more exterior walls of the structure. In other example embodiments, the barrier system comprises a plurality of sealing elements, protective panels and, optionally, tracks comprising shackles or hooks for suspending the protective panels. The barrier panel optionally comprises a thermoplastic olefin, and further optionally comprises a fire-resistant material.

18 Claims, 10 Drawing Sheets

(56) References Cited

U.S. PATENT DOCUMENTS

| | | | |
|---|---|---|---|
| 6,691,761 B1* | 2/2004 | Alkhoury | E06B 9/581 |
| | | | 160/98 |
| 8,393,055 B2 | 3/2013 | Gower | |
| 9,085,864 B2 | 7/2015 | Ortiz | |
| 9,303,448 B2* | 4/2016 | Olkin | E06B 1/56 |
| 9,355,581 B2* | 5/2016 | Lindblom | F16M 13/022 |
| 9,453,314 B2* | 9/2016 | Cadogan | E06B 9/0692 |
| 9,759,373 B2* | 9/2017 | Hough | F16M 13/022 |
| 10,927,520 B1* | 2/2021 | Caputo | E02B 3/16 |
| 2004/0098937 A1 | 5/2004 | Blake et al. | |
| 2013/0094906 A1* | 4/2013 | Rijlaarsdam | E02B 3/102 |
| | | | 405/115 |
| 2014/0110066 A1 | 4/2014 | Rijlaarsdam | |
| 2015/0361714 A1 | 12/2015 | Derode et al. | |
| 2017/0356239 A1* | 12/2017 | Ouyang | E06B 9/80 |
| 2019/0060684 A1* | 2/2019 | West | A62C 2/10 |

* cited by examiner

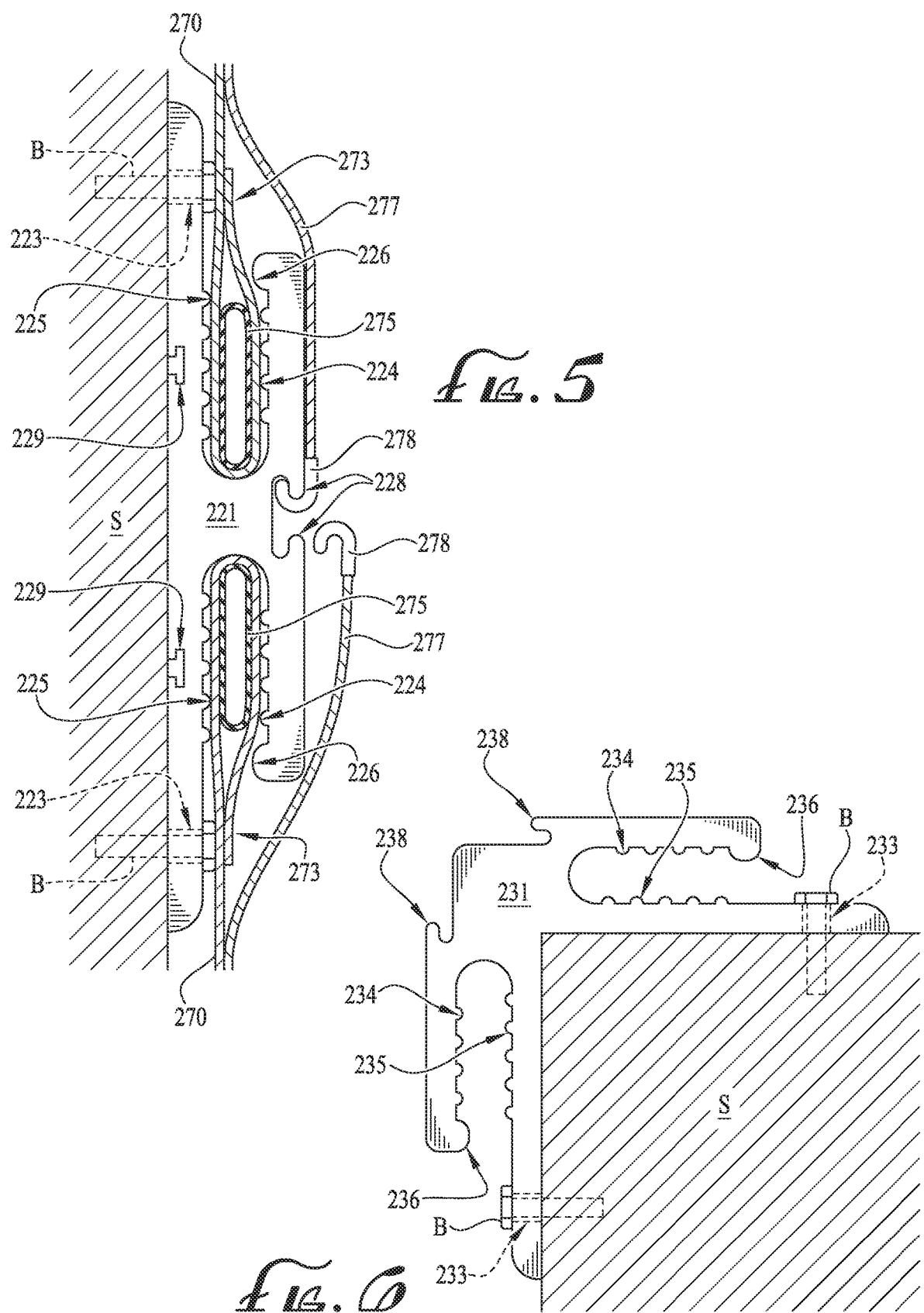

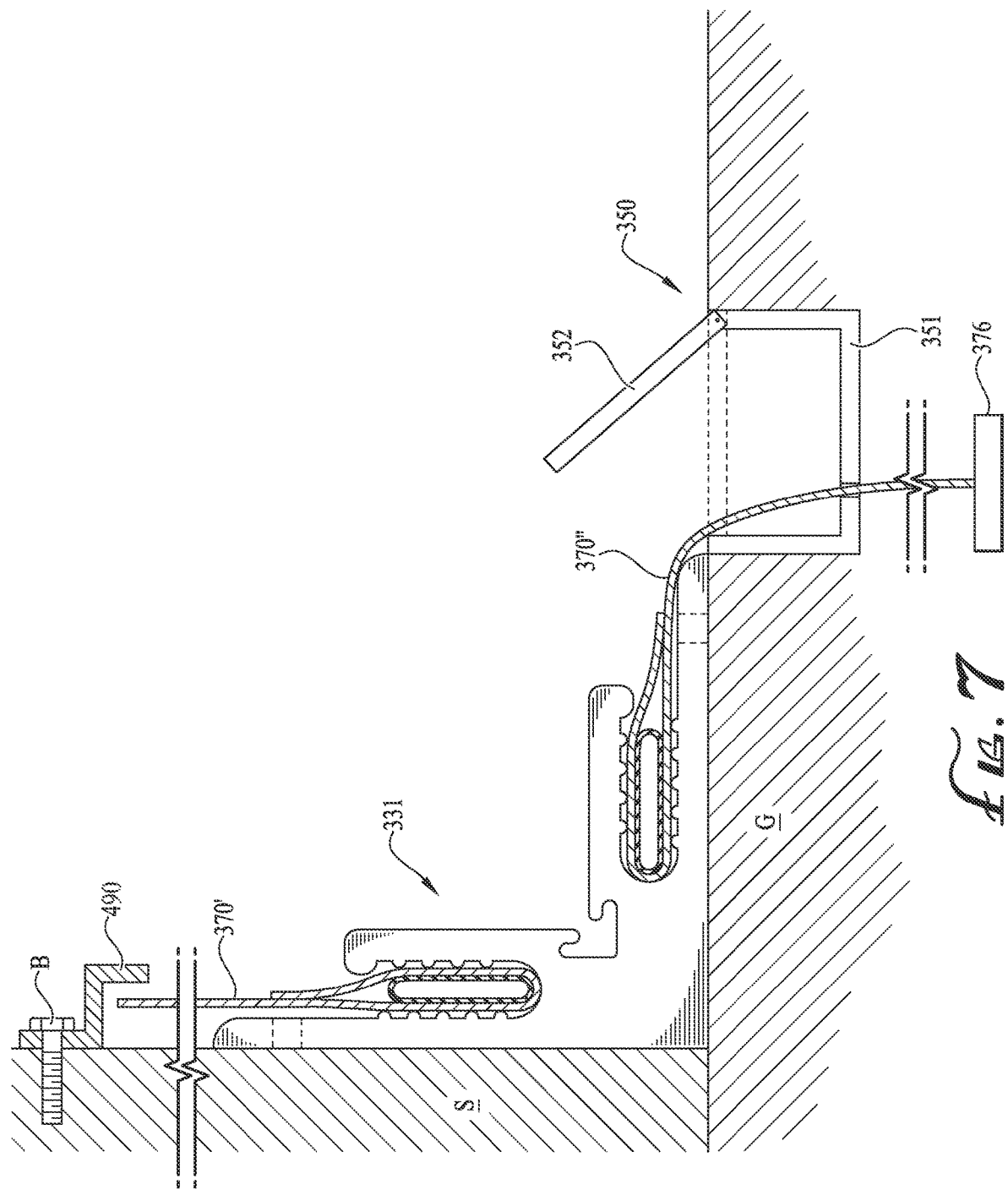

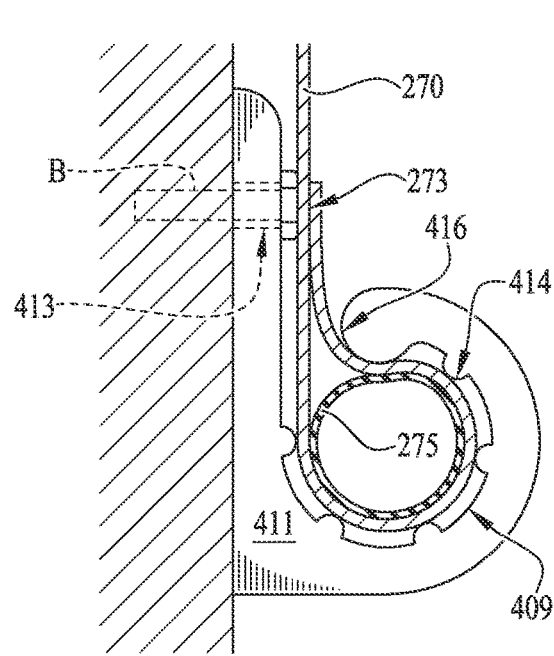
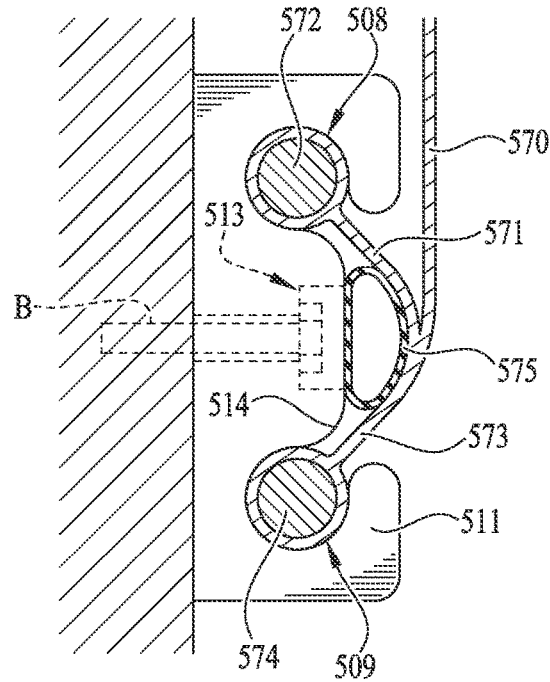
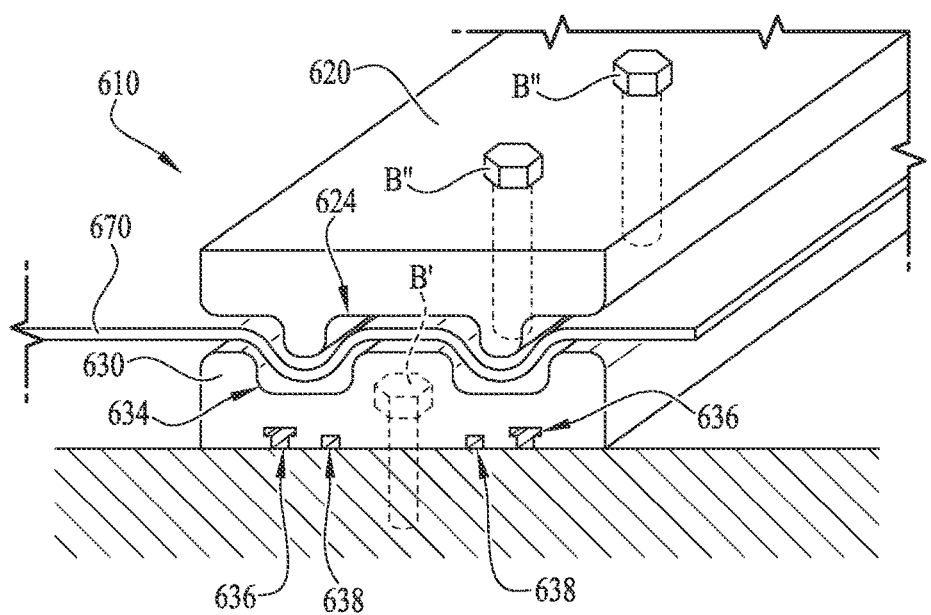

SYSTEM AND METHOD FOR PROTECTING STRUCTURES

CROSS-REFERENCE TO RELATED APPLICATION

This application is a continuation of U.S. patent application Ser. No. 16/775,972, filed Jan. 29, 2020, which claims the benefit of U.S. Provisional Patent Application Ser. No. 62/798,730 filed Jan. 30, 2019, the entirety of which is hereby incorporated herein by reference for all purposes.

TECHNICAL FIELD

The present invention relates generally to the field of external barriers for protecting homes, buildings and other structures, and more particularly to systems and methods for protecting structures from water ingress, flooding, wind and weather damage, wildfires, natural disasters and other potential causes of damage.

BACKGROUND

Sandbags are commonly used to create a temporary dike or barrier to prevent water from entering homes and other buildings in the event of floods. Such measures, however, are labor intensive, time consuming, and expensive to construct and to remove after an emergency and may not prevent water damage in the event of leakage through or between sandbags, and/or stormwater accumulation inside a sandbag barrier. Other natural and manmade causes, such as high winds, wildfires, flying debris, and the like may also cause damage to structures.

Accordingly, needs exist for improved systems and methods of preventing damage to homes, buildings and other structures caused by flooding and other causes. It is to the provision of improved systems and methods meeting these and other needs that the present invention is primarily directed.

SUMMARY

In example embodiments, the present invention provides improved systems and methods for preventing damage to homes, buildings and other structures caused by flooding, storms, wind, fires, and other potential causes of damage. In example forms, the present invention provides a temporary protective barrier system that is quick and easy to implement in an emergency, and easy to take down after the emergency has passed.

In one aspect, the present invention relates to systems and methods for protecting structures substantially as described and shown herein.

In another aspect, the invention relates to a system for protecting a structure. The system preferably includes at least one support and attachment element for attachment to the structure, and a barrier panel for attachment around at least a portion of the structure by the at least one support and attachment element.

In still another aspect, the invention relates to a method of protecting structures. The method preferably includes mounting at least one support and attachment element to the structure; and securing at least one protective panel having a top edge, a first side edge, a second side edge, and a bottom edge to the support and attachment element, for example by suspending the protective panel from the support and attachment element by the protective panel's top edge.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1A is a detailed view of a top track with rollers shown in FIG. 1.

FIG. 5 is a profile view of a double-sided linear seal extrusion according to an example embodiment of the present invention.

FIG. 6 is a profile view of a double-sided convex (outside) corner seal extrusion according to an example embodiment of the present invention.

FIG. 7 shows a double-sided concave (inside) corner seal extrusion in use with a ground barrier panel and receptacle according to another example embodiment of the present invention.

FIG. 8 is a profile view of a single-sided round barrier seal extrusion according to another example embodiment of the present invention.

FIG. 9 is a profile view of a keder-style barrier seal extrusion according to another example embodiment of the present invention.

FIG. 10 is an isometric view of a vise barrier seal assembly according to yet another example embodiment of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
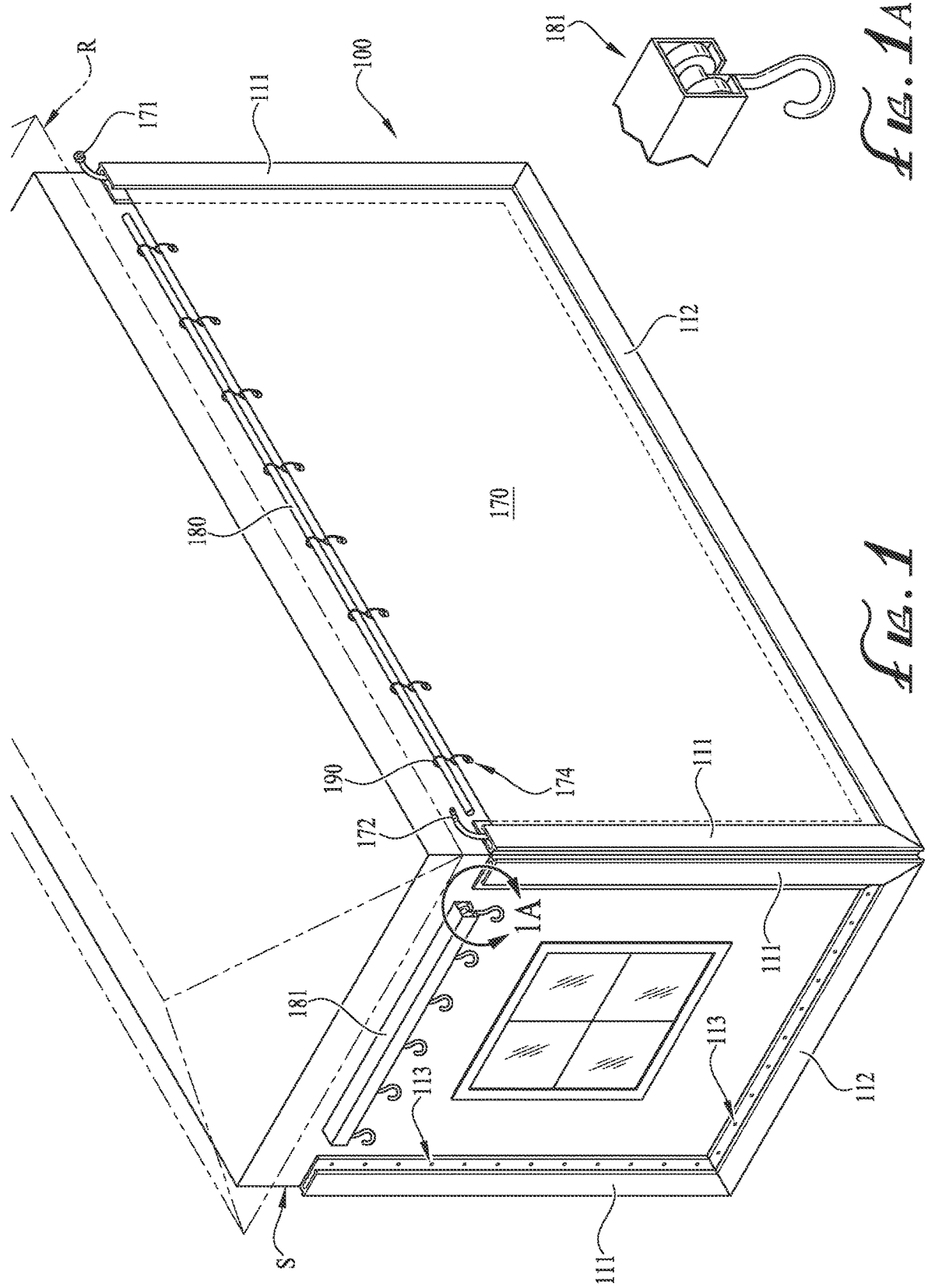
FIG. 1 is an isometric view of a barrier system in use on a structure according to an example embodiment of the present invention.

With reference now to the drawing figures, wherein like reference numbers represent corresponding parts throughout the several views, FIG. 1 shows a structure S, such as a house or other building, with a temporary barrier system 100 applied thereon. According to example embodiments of the present invention, barrier system 100 comprises a plurality of vertical single-sided barrier rails or seal extrusions 111, horizontal single-sided barrier rails or seal extrusions 112, protective barrier panels, sheets or coverings 170, and top tracks or rails 180. Top tracks 180 are mounted along the top edges of the structure's exterior walls. In example embodiments, the top tracks are secured immediately under the structure's eaves or soffits, for example anchored to the rafters, studs, and/or top plate of wall framing. Alternatively, the top tracks may be mounted at any level, height or arrangement along the structure's exterior as desired by the user.

Barrier panels 170 are secured to top track 180 and suspended therefrom. In example embodiments, the barrier panels are suspended from the top tracks with hooks and/or shackles 190, for example such as carabiners, D-hooks and rings or hoops. Alternatively, clips, clasps, and other similar attachment means may be used. The loose edges of the suspended barrier panels 170 are introduced or inserted or otherwise received into barrier seals 111 and 112 wherein the barrier seals are preferably secured to the perimeter of each exterior wall of structure S, namely, the side and bottom edges of each exterior wall. In some example embodiments, one or more exterior walls or sides of the structure may comprise only barrier seals to secure the barrier panel thereon. For example, the top track 180 may be replaced with another barrier seal extrusion 112 to secure the top edge of the barrier panel 170. In other example embodiments, neither a top track nor a barrier seal extrusion may be provided at the top edge of the structure's wall and the top edge of the barrier panel 170 may be left unattached. In alternate embodiments, barrier seals 111 and 112 may be arranged in any manner as desired by the user or as required per application.

As depicted in FIG. 1, barrier system 100 comprises at least one support and attachment element comprising at least one first coupling element mounted under a soffit or roof overhang of the structure, for example, a plurality of top tracks 180 and 181, and at least one second coupling element, for example shackles 190, configured for resealable engagement with a corresponding first element. Top tracks 180 and/or 181 and shackles 190 are typically used together for suspending barrier panels 170 over the structure's exterior. In example embodiments, top tracks 180 are ¾ in. aluminum round rods secured to the structure's exterior walls. In some embodiments, shackles 190 are carabiners, or more specifically, 3⅛ in. aluminum carabiners with sufficient weight capacity to support the weight of the barrier panel 170. In other example embodiments, bungee cords or cables may be further incorporated to create combinations of hooks or shackles and cords to accommodate for varying distances between the top track and the top edge of barrier panel. In further embodiments, various other couplings or connectors may be utilized for attachment of barrier panels to the tracks, the structure, and/or other supporting elements.

In alternate embodiments, the barrier system may comprise top tracks or rails 181 with integrated rollers or slide-able hooks or shackles. Top track 181 may also be automated, for example including one or more motors or other drive mechanisms, components, electronic switches, sensors, and/or other actuation components or systems to allow the user to control the movement of the hooks or shackles from a centralized or remote controller or to provide automated control and deployment. In still other example embodiments, the top tracks 180 and 181 may be forgone altogether and the barrier panel may be secured directly onto the exterior wall of the structure by means of fasteners, such as for example bolts, screws, industrial snap systems, twist-locks, and/or horizontal/vertical fasteners or any combination thereof.

Figure 2:
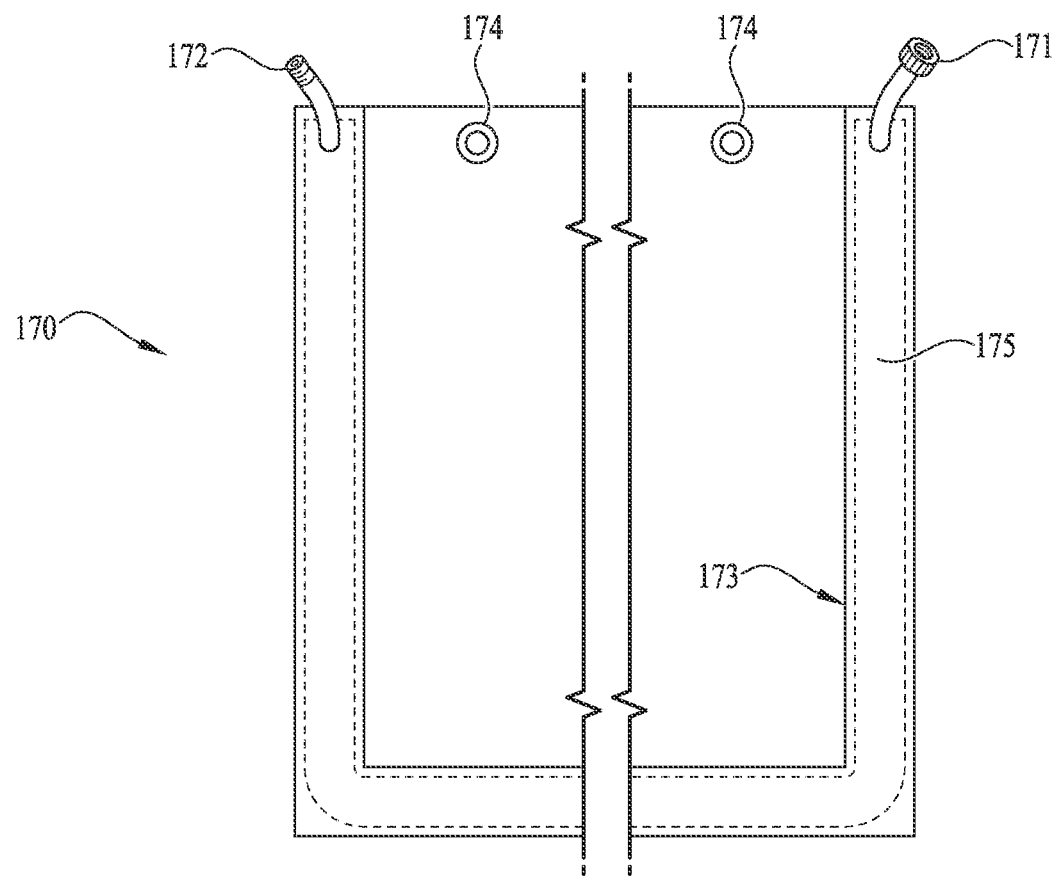
FIG. 2 is a front view of a protective barrier panel of the barrier system of FIG. 1.

FIG. 2 shows a barrier panel 170 according to example embodiments of the present invention. In example embodiments, the barrier panel or sheet is formed of thermoplastic olefin (TPO) sheet or other waterproof flexible sheeting or panel material. In example embodiments, the thickness of the TPO material is 45 mils, or alternatively may be 60 mil or 80 mil membrane thickness. However, barrier panel 170 may be of other waterproof or water-resistant material including polyester reinforced polyvinyl chloride membrane, plastics for example such as amorphous or semicrystalline thermoplastics, composites, metals, natural or synthetic rubber, vinyl, or other natural materials, synthetic materials, and/or combinations thereof, and of varying thickness. Barrier panel 170 may be formed as panels having widths of 8', 10', and 12' or otherwise as required per application.

According to example embodiments, barrier panel 170 comprises a plurality of grommets or eyelets 174 fixed along the top edge of the panel. Shackles 190 are threaded through the grommets and secured around or over the top track 180 to suspend the barrier panel 170 along its top edge. In other example embodiments, the barrier panel may be secured directly onto the exterior wall of the structure by means of fasteners, such as for example bolts, screws, industrial snap systems, twist-locks, and/or horizontal/vertical fasteners or any combination thereof. The remaining edges are hemmed thereby forming a continuous pocket or sleeve 173 configured for receiving a hose or tubing 175 as shown in FIG. 2. In example embodiments, the hemmed edges are formed by folding over and heat welding the edges of the barrier panel. Alternatively, welding can be accomplished by various welding methods, such as for example, hot gas welding, hot wedge welding, vibration welding, dielectric welding, induction welding, ultrasonic welding, or other thermal, mechanical and electromagnetical welding methods and/or combinations thereof. In other example embodiments, the hemmed edges may be formed by sewing, applying adhesives, and/or applying other methods of hemming edges.

Tubing 175 is formed from expandable or stretchable materials, for example such as neoprene rubber, silicone rubber, butyl rubber, isoprene rubber, nitrile rubber, thermoplastic polyurethane rubber, styrene-butadiene rubber, other natural and synthetic rubbers and/or any combinations thereof, so that when filled or pressurized with air, water, or other liquid or fluid, the tubing expands within the sleeve. In some example embodiments, tubing 175 may be sheathed in a braided casing or sleeve, wherein the braided casing is formed from nylon, stainless steel, polyethylene terephthalate, or any other applicable material, such as for example, plastics, composites, metals, natural materials, synthetic materials, and/or combination thereof. The braided casing protects the tubing from wear and tear, and/or reinforces the tubing to prevent bursting due to excessive pressure. In example embodiments, the braided casing reinforces the tubing up to 400 pounds per square inch of pressure (psi). In other example embodiments, the braided casings may be rated to more or less than 400 psi.

In example embodiments, tubing 175 comprises an input or inlet valve 171 for pumping air or liquid into the tubing and an outlet or release valve 172 for releasing said air or liquid from the tubing when the barrier panel needs to be removed or disassembled. Generally, inlet and outlet valves 171, 172 comprise corresponding connectors or couplings allowing the user to connect one inlet valve to another outlet valve of an adjacent panel to form a single, continuous assembly of a plurality of tubing. In other example embodiments, tubing 175 may comprise only one valve, the one valve being configured for both input and release functions. In some example embodiments, the barrier panel may comprise more than one section of tubing. For example, the barrier panel may include three distinct and separate hemmed edges wherein each hemmed edge contains a separate and discrete tubing with its own valve(s). In still other example embodiments, every edge of the barrier panel, including the top edge, may be hemmed and include tubing as described herein.

Figure 3:
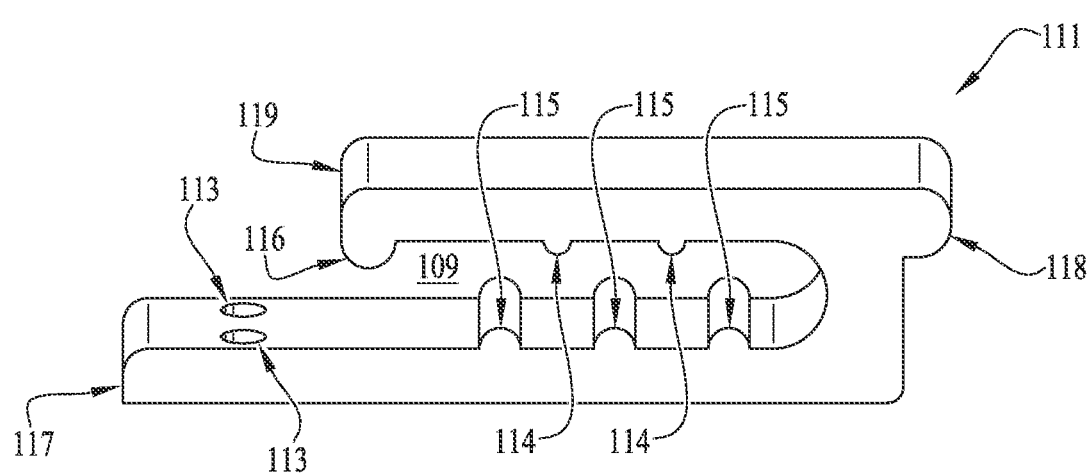
FIG. 3 is an isometric profile view of a barrier seal extrusion of the barrier system of FIG. 1.

FIG. 3 shows a profile view of a section of single-sided seal extrusion, for example such as barrier seals 111 and 112 of FIG. 1. According to example embodiments of the present invention, barrier seals 111 and 112 generally comprise a U-shaped profile. According to the depicted embodiment of FIG. 3, barrier seal 111 comprises an inner or bottom portion 117 and an outer or top portion 119, the inner and outer portions forming a securing channel or slot 109. Generally, the inner portion includes a plurality of mounting holes 113 configured for bolts, screws, or other fasteners used to secure the barrier seal to the exterior surfaces of structure S. Barrier seal 111 also includes a plurality of ridges or ribs 114, 115, and 116. In example embodiments, ribs 114, 115 and 116 are of various sizes or dimensions. In other example embodiments, ribs 114, 115 and 116 may comprise uniform or varying sizes and/or shapes. For example, as shown in FIG. 3, ribs 114, 115 and 116 all share a round profile, but rib 116 is larger than ribs 114 and 115. In the depicted embodiment, a larger rib 116 creates a narrower opening or threshold to the securing channel 109 and thus provides greater resistance to a panel edge being unintentionally pulled out from the securing channel when the hemmed edge is expanded during use. According to example embodiments, the barrier seals may further comprise a mounting or clasp edge 118 on the exterior surface of outer portion 119.

According to example embodiments, barrier seals may comprise extruded aluminum. Alternatively, barrier seals may be produced from other materials, including plastics, composites, metals, natural materials, synthetic materials, and/or combination thereof, and by other applicable manufacturing processes.

According to example embodiments, single-sided barrier seals 111 and 112 are secured around the perimeter of one or more exterior walls of a structure to be protected, for example as shown in FIG. 1. Preferably, the barrier seals are arranged so that securing channels 109 are open towards the center of the structure's wall and oriented for receiving one or more edges of a barrier panel 170. In use, barrier panels 170 are suspended along their top edge from top tracks 180 using a plurality of shackles 190. The remaining edges are slid or introduced into the securing channels 109 of barrier seals 111 and 112. Once the loose edges are properly aligned along and within the barrier seals, pressurized air or liquid is pumped or otherwise introduced into the barrier panel tubing 175 through input valve 171. As tubing 175 expands, the hemmed edges 173 of the barrier panel fill the cavity of the securing channels 109 and creates a water-tight seal between the barrier panel 170 and barrier seals 111 and 112. In some example embodiments, the input valve of one panel may be coupled to the outlet valve of an adjacent barrier panel to form a continuous tubing allowing the user to fill multiple panel tubing through a single input valve. In other embodiments, release valve 172 may be capped or otherwise closed and each panel tubing of different barrier panels may be filled individually.

In example embodiments, tubing 175 expands within channel 109 as air or liquid is pumped into tubing through inlet 171. As tubing 175 expands, pressurized contact between the hemmed/tubed edges 173 of the barrier panel 170 and the inner surface of channel 109 creates a water-tight seal. Generally, rib 116 comprises an enlarged profile which restricts the opening to the securing channel or slot 109. The restricted opening is typically large enough to allow the user to insert a hemmed edge with ease when tubing is empty and in a contracted state but prevent the hemmed edge from being pulled out of channel 109 when tubing is filled and in an expanded state. Additional ribs 114 and 115 around the securing channel 109 create a contoured interface and increase the contact surface area between the barrier panel and securing channel 109, thereby improving the seal between the two components. In the event of flooding or wind-driven rain, the water-tight seal prevents water from trespassing the barrier system 100 and protects the structure S from any water ingress, while the barrier panel protects the structure against impacts from wind-driven objects. In use, pressure against the barrier panels from the surrounding floodwater further seals against water ingress into the structure.

Figure 4:
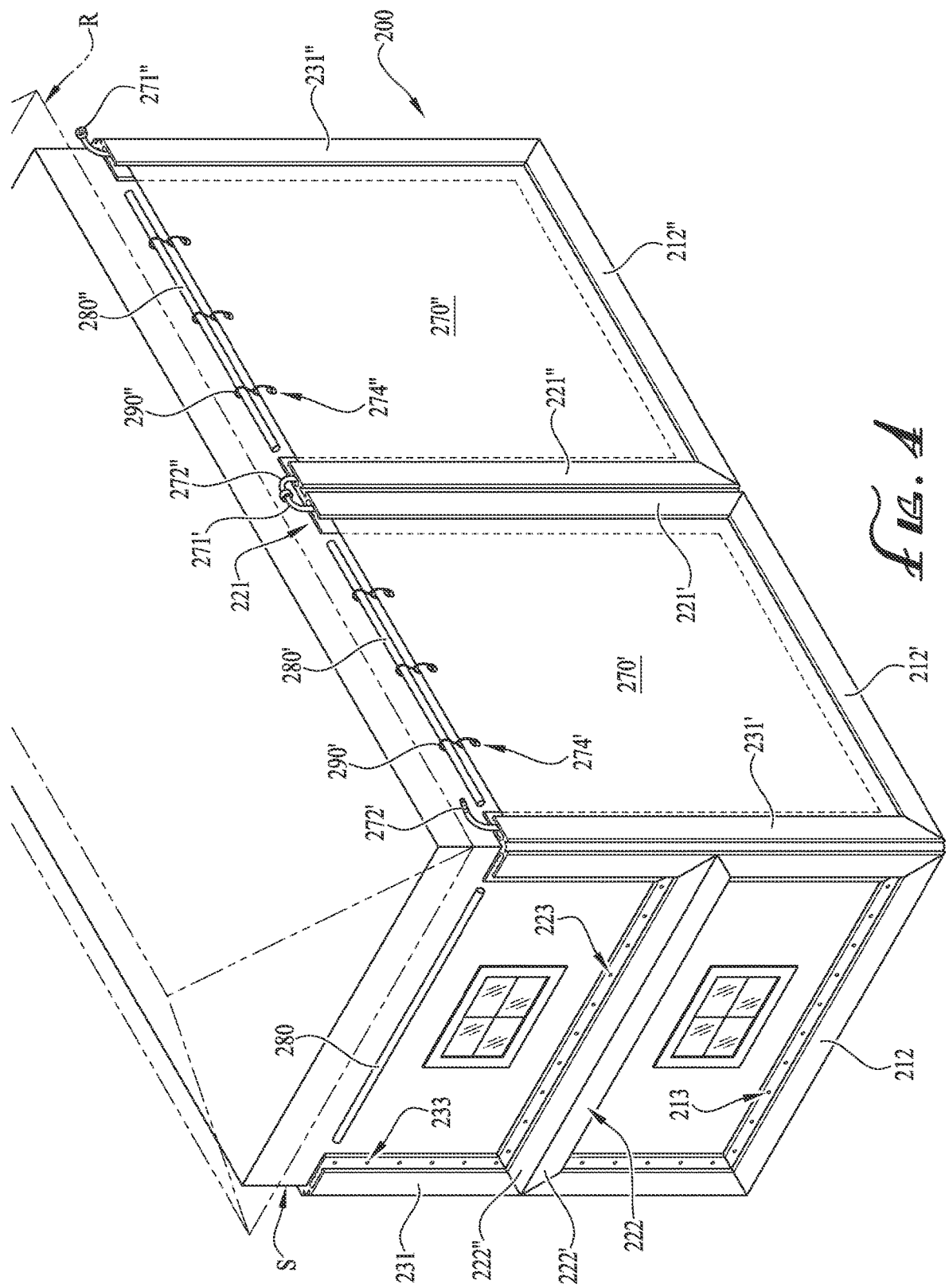
FIG. 4 is an isometric view of a barrier system comprising double-sided linear and corner barrier seal extrusions in use on a structure according to another example embodiment of the present invention.

FIG. 4 shows a barrier system 200 according to another example embodiment of the present invention. In the depicted embodiment, barrier system 200 comprises a plurality of barrier panels 270' and 270", top tracks 280' and 280", double-sided corner barrier seals 231, 231' and 231", double-sided linear barrier seals 222 and 221, and single-sided linear barrier seals 212, 212' and 212". The double-sided flat and corner seal extrusions 221, 231 (as best shown in FIGS. 5 and 6, respectively) are unitary extrusions with two sides or sets of securing channels. Generally, double-sided seal extrusions are configured for receiving and connecting two adjacent barrier panels. Double-sided barrier seals are preferred where a structure's exterior is too large to be completely covered with a single barrier panel. As seen in FIG. 4, double-sided flat seals 221 and 222 may be arranged horizontally or vertically across a structure's exterior wall, respectively. In the depicted embodiment, vertical double-sided flat seal 221 is utilized to connect two barrier panels 270' and 270" to cover one side of the structure S. For example, in the depicted embodiment, barrier panels 270' and 270" are suspended from top tracks 280' and 280". The right edge of barrier panel 270' is inserted into the first, left side 221' of the double-sided flat seal 221 and the left edge of barrier panel 270" is inserted into the second, right side 221" of the double-sided flat seal 221. The remaining side and bottom edges of barrier panels 270' and 270" are secured to double-sided corner seals 231' and 231" and single-sided seals 212' and 212". Generally, use of the double-sided flat seals 221 and 222 allows the user to use smaller barrier panels which are more manageable and convenient to handle than large barrier panels. For example, as shown in FIG. 4, instead of utilizing one panel spanning the entire length or height of one side of a multi-story structure, a plurality of smaller panels coupled by double-sided barrier seals may be used to protect the same area.

In some example embodiments, double-sided barrier seals may be arranged laterally across the exterior wall of a structure. For example, FIG. 4 shows a double-sided barrier seal 222 fixed laterally across a two-story building. In this example embodiment, two versions of barrier panels are used—a first barrier panel comprising a top edge with grommets to engage with shackle suspended from a top track and a second barrier panel comprising a hemmed top edge with tubing. According to the example embodiment, the first barrier panel is applied to a portion of the wall above the double-sided barrier seal 222 wherein the first barrier panel is suspended from top track 280 along its top edge, its side edges are secured to barrier seals 231 and 231', and its bottom edge is secured to the top side 222" of barrier seal 222. In contrast, the second barrier panel is suspended directly from the bottom side 222' of double-sided seal 222 and the side and bottom edges of the second panel are secured to barrier seals 231, 231' and 212. Preferably, the tubing within top edge of the second barrier panel is independent from the tubing around the panel's remaining edges to allow the user to secure panel's top edge prior to securing the panel's remaining edges.

Similarly, double-sided corner seal extrusions, for example, 231, 231' and 231", may be mounted to an exterior corner of a structure to join barrier panels on both sides of the corner, as shown in FIG. 4. While FIG. 4 shows corner seals comprising substantially 90° convex profiles, corner seals may comprise any angle or form as needed for each application—for example, convex (outside) corner seals 231 of FIG. 6 or a concave (inside) corner seal 331 of FIG. 7.

In other example embodiments, more than one single-sided seals may be secured side-by-side in lieu of a double-sided barrier seal and serve the same purpose.

FIGS. 5 and 6 show example profiles of the flat and corner double-sided seal extrusions 221 and 231, respectively. Generally, the double-sided seals comprise similar features and profile of the single-sided seals. For example, double-sided seals 221, 231 comprise a plurality of mounting holes 223, 233 configured for bolts, screws, or other fasteners B for mounting the seals to the exterior of a structure S. Barrier seals 221, 231 also comprise a plurality of ridges or ribs 224, 225, 226, 234, 235 and 236 and clasp edges 228, 238.

According to some example embodiments, barrier panels 270 may further comprise cover flaps 277 welded or otherwise attached near and over the hemmed/tubed edges 273 of the panels, as shown in FIG. 5. The cover flaps 277 comprise securing mechanisms 278, such as a clasps or hooks, which are configured to engage or mount onto mounting edges 228, 238. When properly engaged, cover flaps reinforce the coupling between the barrier panels 270 and barrier seals 221 and provide greater protection from the barrier panels becoming accidently detached from the barrier seals. In still other example embodiments, the cover flaps and barrier seals may comprise other reciprocal mechanisms or methods for providing additional security to the connection between the cover flaps and barrier seals, for example such as snap fit connectors, buttons, zip fasteners including zippers, slider-less zippers, and plastic zippers, and/or hook-and-loop fasteners.

In other example embodiments, the exterior of the seal extrusions may be covered with the same or similar siding material of the structure's exterior wall to camouflage the seal extrusions against the wall. In yet another example embodiment, the seals may be painted or otherwise covered to make the seals more or less visible on the exterior wall.

As shown in FIG. 7, the barrier system may further comprise a ground barrier panel 370" comprising a first end and a second end according to some example embodiments of the present invention. In use, the first end of the ground barrier panel is buried underground while the second end is exposed above ground. The ground barrier panel 370" is generally embedded into the ground around the protected structure S to prevent floodwater from seeping into the structure's foundation or structure through the ground. Typically, the first end of the ground barrier 370" is buried, preferably 24 inches to 30 inches, underground; however, the depth may be adjusted as needed per application. At its first end, ground barrier 370" comprises an anchor 376 to prevent the ground barrier from being unintentionally uprooted or pulled out from the ground. The anchor 376 may comprise a specific profile, such as a T-shaped profile, to prevent the ground barrier from becoming uprooted. Alternatively, the anchor 376 may comprise an additional weighted component. The second end or edge of the ground panel 370" is typically hemmed and tubed as described herein and configured for engaging a barrier seal. For example, as shown in FIG. 7, the exposed end of ground barrier 370" is secured to double-sided corner barrier seal 331 mounted to the corner between the exterior of a structure S and ground G. In other example embodiments, the top edge of the ground barrier 370" may be raised to a level higher than the bottom edge of an exterior wall and secured thereon by a one or more single-sided and/or double-sided seal extrusions.

In alternate example embodiments, a receptacle 350 comprising a receptacle base 351 and a hingedly-fixed lid 352 may be provided in the ground G and around the structure S for storing away the exposed end of the ground barrier 370" when the barrier system is not in use. Ground G may be the soil, asphalt, concrete, or any other foundation underneath and/or around the structure. In some example embodiments, the receptacle 350 may also be used to store other barrier panels, tools, and/or components described herein.

FIG. 8 shows a barrier seal 411 according to an alternate embodiment of the present invention. Barrier seal 411 comprises a generally rounded securing channel 409 and a plurality of ridges or ribs 414, 416. In use, as tubing 275 is filled with air, or liquid, hemmed edge or sleeve 273 expands within the securing channel or slot 409 and creates a water-tight seal inside barrier seal 411. Generally, rib 416 comprises an enlarged profile which restricts the opening to the securing channel or slot 409. The restricted opening is typically large enough to allow the user to insert hemmed edge 273 with ease when tubing 275 is empty but prevent the hemmed edge 273 from being accidentally pulled out of channel 409 when tubing 275 is filled. Additional ribs 414 may be provided around the securing channel 409 to contour the securing channel surface and increase the contact surface area between the hemmed edge 273 and securing channel 409, thereby improving the seal between the two components.

FIG. 9 shows a keder-style seal 511 according to another embodiment of the present invention. Keder-style seal 511 comprises two round channels 508, 509 spaced apart from one another. The two round channels comprise narrow gates or openings generally oriented angularly towards one another. The keder-style seal is configured to be used with a keder barrier panel 570. In example embodiments, the edges of keder barrier panel 570 are split into two separate end portions 571 and 573 wherein each end portion comprises a keder or flexible insert embedded at the edge of each end portion. The barrier panel further comprises tubing 575 attached to the panel between end portions 571, 573. Generally, keder-style seals 511 are mounted to the exterior of a structure using fasteners B, such as, for example, bolts, screws, and/or nails, through mounting holes 513. In example embodiments, a plurality of mounting holes 513 are provided every 6 in. to 12 in. on the raised portion 514 of seal 511 between its two round channels 508, 509, as shown in FIG. 9. Typically, the mounting holes 513 are countersunk to prevent any abrasion of tubing 575 caused by contact with fasteners B. In other example embodiments, mounting holes may not be prefabricated on the barrier seals but rather created by the user during installation of the barrier seals on the structure.

In use, the end portions 571 and 572 of a keder barrier panel 570 are inserted and guided along the round channels 508, 509, respectively. When all applicable edges of the keder barrier panel are properly secured to the keder-style seals, tubing 575 is pumped with air or liquid. As the tubing expands between the body of the seals and barrier panels, an outward force is applied to the end portions 571 and 572 pulling the keder-embedded ends against the restricted openings. Generally, tubing 575 is pressurized until a water-tight seal is created between the keder-embedded ends of portions 571 and 572 and keder-style barrier seals 511.

FIG. 10 shows a vise-style seal assembly 610 which comprises a male vise seal component 620 and an inter-engaging female vise seal component 630 having cooperative mating profiles 624 and 634, respectively, configured to securely retain an edge of a barrier panel 670. According to example embodiments, mating profile 634 comprises a double channel design with parallel first and second engagement channels spaced a small distance from one another as depicted, but various alternate mating profiles may be provided within the scope of the invention.

In example embodiments, the female vise seal component 630 is mounted to the exterior of a structure S, as shown in FIG. 10. In example embodiments, the vise seal extends entirely, or substantially entirely, around the perimeter of the foundation and/or exterior walls of structure S. In other example embodiments, the female vise seal 630 may be set in a recess along the mounting surface to provide a flush surface appearance.

During use, the edges of the barrier layer 670 are compressed between the male and female seal components 620, 630 to create a water-tight seal around the perimeter of the barrier layer. In example embodiments, the male vise seal component 620 is secured to the corresponding female vise seal component 630 by means of threaded bolts B" along the center length of the male seal component 620, as shown in FIG. 10. In example embodiments, the male and female seals 620, 630 comprise threaded bores along their center lengths for receiving the threaded bolts B". In use, the bores of the male and female seals are aligned such that the threaded bolts engage both the male and female seals, thereby securing the male seal to the female seal. In other embodiments, the male edge seal is fastened to the female edge seal using cam levers, cam clamps, snap couplings, toggle clamps, clamping levers, tensions levers, knobs, hold-down clamps or other fastening or attachment means. In yet other embodiments, the male and female edge seals are further connected by hinge elements and/or systems.

A rubber washer and/or caulk may be further incorporated around the threaded bores to provide greater seal functionality. Teflon tape, or like material, may be used around threaded fasteners B', B" to further prevent leaks. However, it will be understood by one of ordinary skill in the art that a variety of other methods may be used to mount the barrier seals described herein to appropriate mounting surfaces and create proper seals to prevent fluid infiltration.

In other embodiments, male and female vise seal components 620, 630 further comprise layers or films of compressible or gasket material adhered to one or both mating surfaces 624 and 634 to improve the seal between the vise seal components and barrier panel 670. The layer of compressible material may be of natural or synthetic rubber, silicone, cork, felt, neoprene, fiberglass, polytetrafluoroethylene, natural or synthetic polymers, or other natural or synthetic materials, and/or combinations thereof. In alternate embodiments, the gasket material is adhered on and/or near the sides of the seals.

Figure 11:
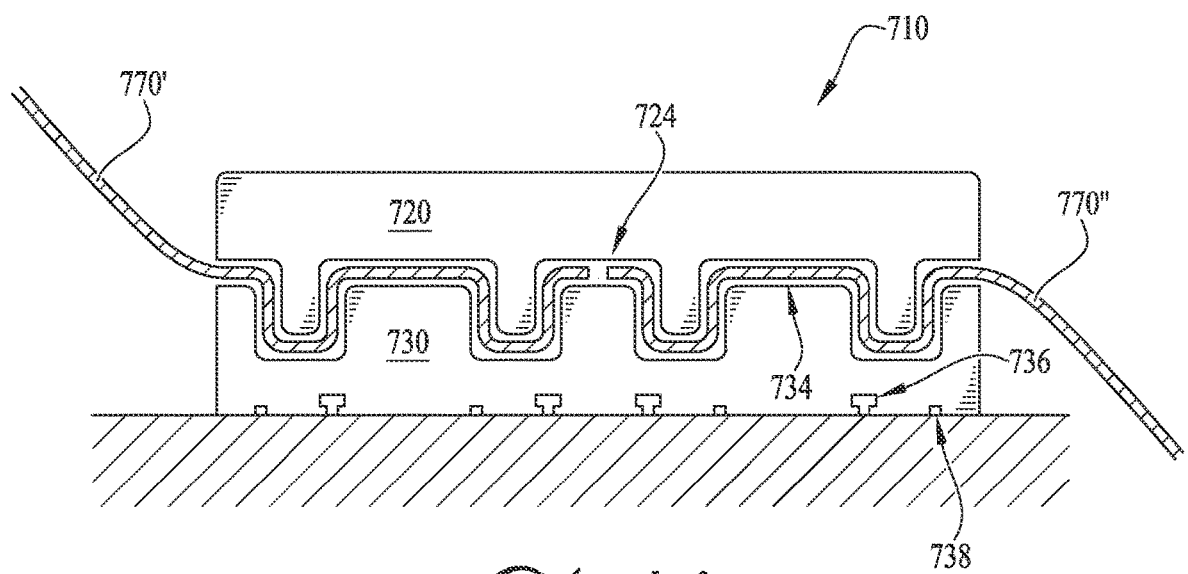
FIG. 11 is profile view of a double-wide variation of the vise barrier seal assembly of FIG. 10.

FIG. 11 shows a double-width vise seal assembly 710 according to another example embodiments. Double-width vise seal assembly 710 comprises a male vise seal component 720 and female vise seal component 730. In example embodiments, female vise seal component 730 comprises a mating profile with four cooperating sets of channels. Corresponding male vise seal component 720 comprises a profile with four sets of ribs that correspond to the channels of the female vise seal component 730. However, various mating profiles may be used within the scope of the invention. In alternate example embodiments, the double-width vise assembly 710 may be substituted with two vise seal assemblies 610 mounted next to one another. In yet other example embodiments, the vise seal assembly may comprise one double-width female vise seal component 730 and two male vise seal components 620, or vice versa—specifically, one double-width male vise seal component 720 and two female vise seal components 630.

Double-width vise seal assemblies 710 are preferably used to couple two adjacent barrier panels along a structure's exterior wall, similar to the application of a double-sided barrier seal 221 as shown in FIG. 4. In some example embodiments, a barrier panel may extend around corners of the protected structure. In another example embodiment, vise seal assemblies 610 and 710 may comprise angled, arced, or L-shaped profiles and be configured to be mounted to a structure's corner to connect barrier panels from adjacent exterior walls. In some embodiments of the present invention, the structure's corners may be ground, shaved, deformed, or otherwise modified to accommodate non-linear profiles of the barrier seals and barrier seal assemblies.

Figure 12:
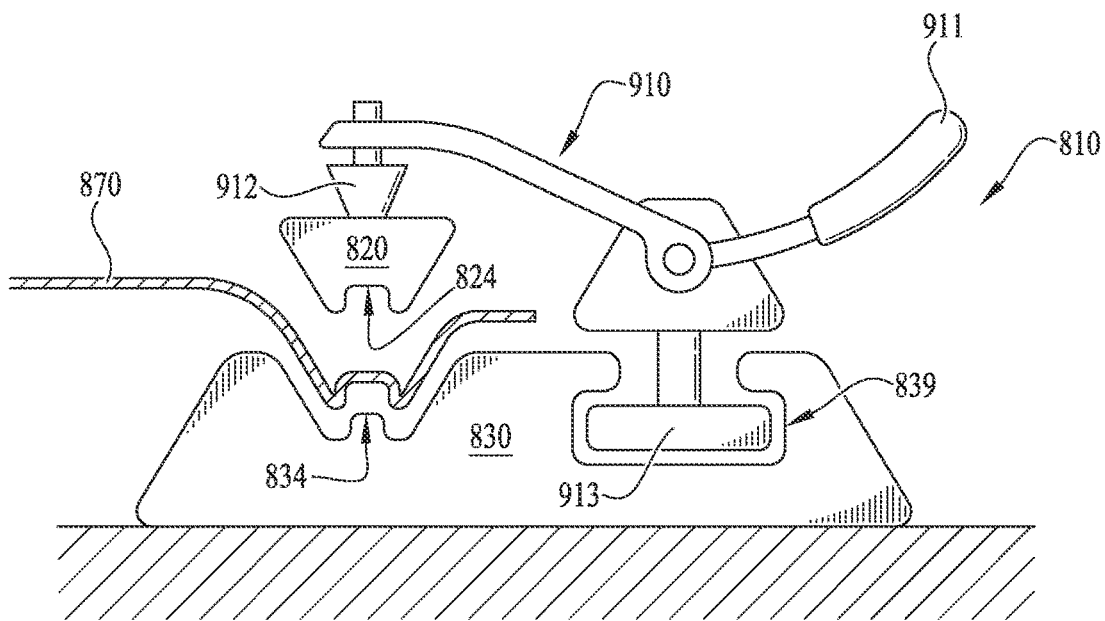
FIG. 12 is a profile view of yet another variation of the vise barrier seal of FIG. 10.

According to an alternate embodiment, the vise seal assembly 810 comprises a female vise seal component 830 having a profile comprising a generally V-shaped or W-shaped channel 834 and a T-shaped channel or slot 839, as shown in FIG. 12. The seal assembly further comprises a male vise seal component 820 having a reciprocal or corresponding profile 824. In use, the male vise seal component 820 is pressed into the female seal 820 by securing means, such as for example flip lever clamps, hold-down cams, hold-down toggle clamps 910 (as shown in FIG. 12), and other like systems and securing means. In the depicted example of FIG. 12, toggle clamp 910 comprises a handle 911, T-base or -bolt 913, and clamp foot or tip 912. T-bolt 913 is slidably located within T-slot 839 of female vise seal component 830. As handle 911 is activated, clamp foot 912 engages the male vise component 820 and presses it firmly into the dedicated female channel 834. Generally, an edge of a barrier panel 870 is introduced or engaged between the male and female vise seal components 820, 830 effectively forming a water-tight seal between the seal components and barrier panel.

Figure 13:
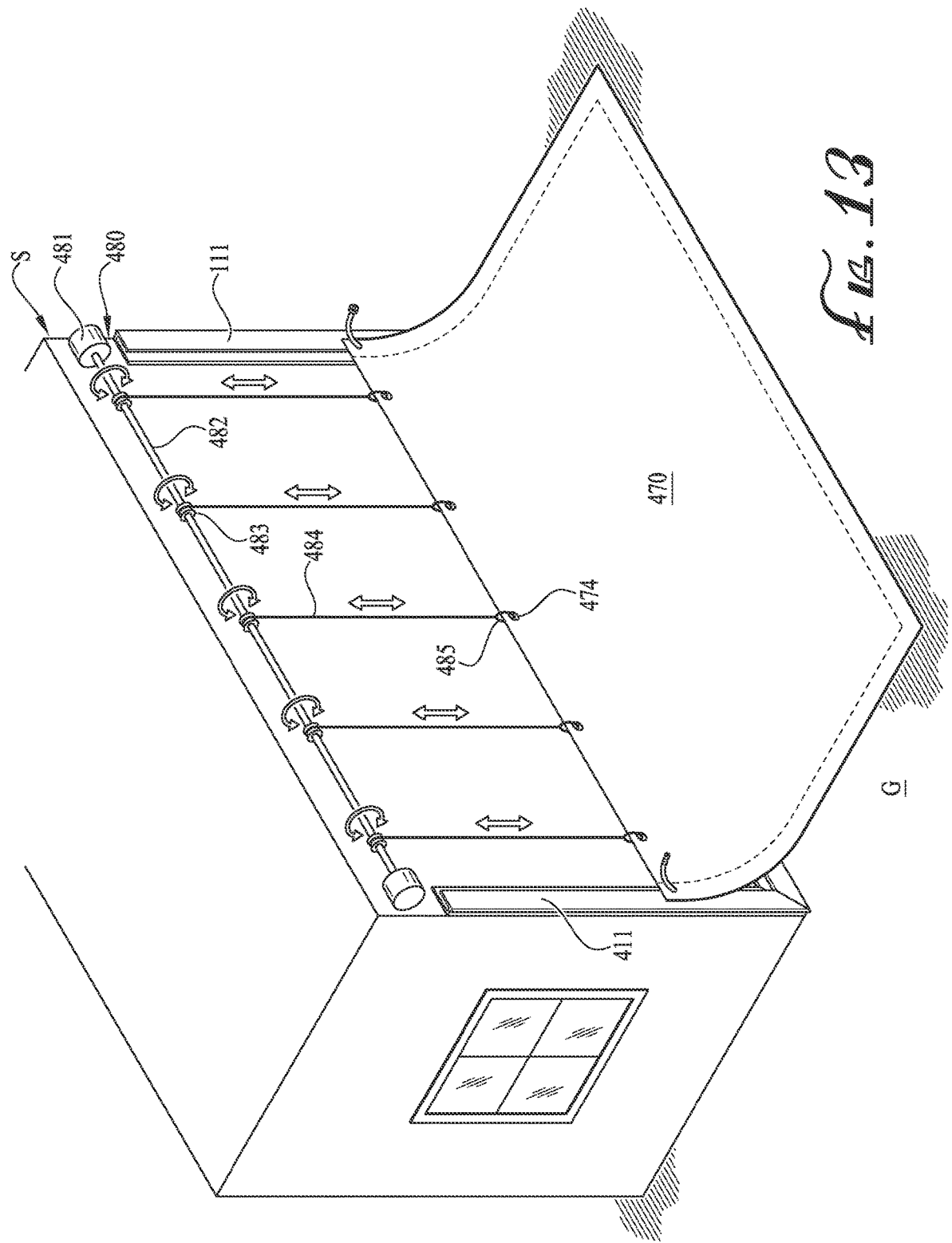
FIG. 13 shows a pulley panel deployment system according to an example embodiment of the present invention.

FIG. 13 shows a pulley barrier deployment system 480 for raising a barrier panel 470 from the ground during installation of the barrier panel. The pulley system 480 is attached to the top of a wall, preferably immediately under the soffit or eave of the structure, on which one or more of the barrier panels are to be installed. The pulley system includes a support rod 482 operated by a motor or winch 481, at least one spool element 483 fixed along the support rod, and at least one cable element 484, having a first end and a second end, attached to a corresponding spool at its first end and at least one coupling element 485 configured for resealable engagement at its second end. In example embodiments, the pulley system 480 comprises a plurality of spools 483, cables 484, and coupling elements 485, such as for example, shackles, carabiners, clips, clasps or hooks. The winch 481 is operable in both clockwise and counter-clockwise directions, wherein rotation in one direction pulls up the cables 484 and rotation in the second direction drops the cables 484. The winch 481 may be configured for manual or motorized operation.

In example modes of use of the pulley barrier deployment system 480, a barrier panel 470 is placed on the ground and its top edge is aligned to a wall on which the barrier panel will be secured. The barrier panel may be in its pre-rolled form or laid substantially flat on the ground. The carabiners 485 are lowered to the ground by operation of the winch 481. The carabiner 485 are then secured to the grommets 474 aligning the top edge of the barrier panel. When the winch is operated in reverse, cables 484 are pulled up and the top edge of the barrier panel is raised along the structure's wall. The loose edges of the suspended barrier panel are then sealed and secured to the wall by one or more barrier seals as described herein. In some example embodiments, the barrier panel may deployed directly from a trough or underground storage receptacle installed around the structure and aligned to the structure's exterior walls wherein the barrier panel may be stored away when not in use.

Figure 14:
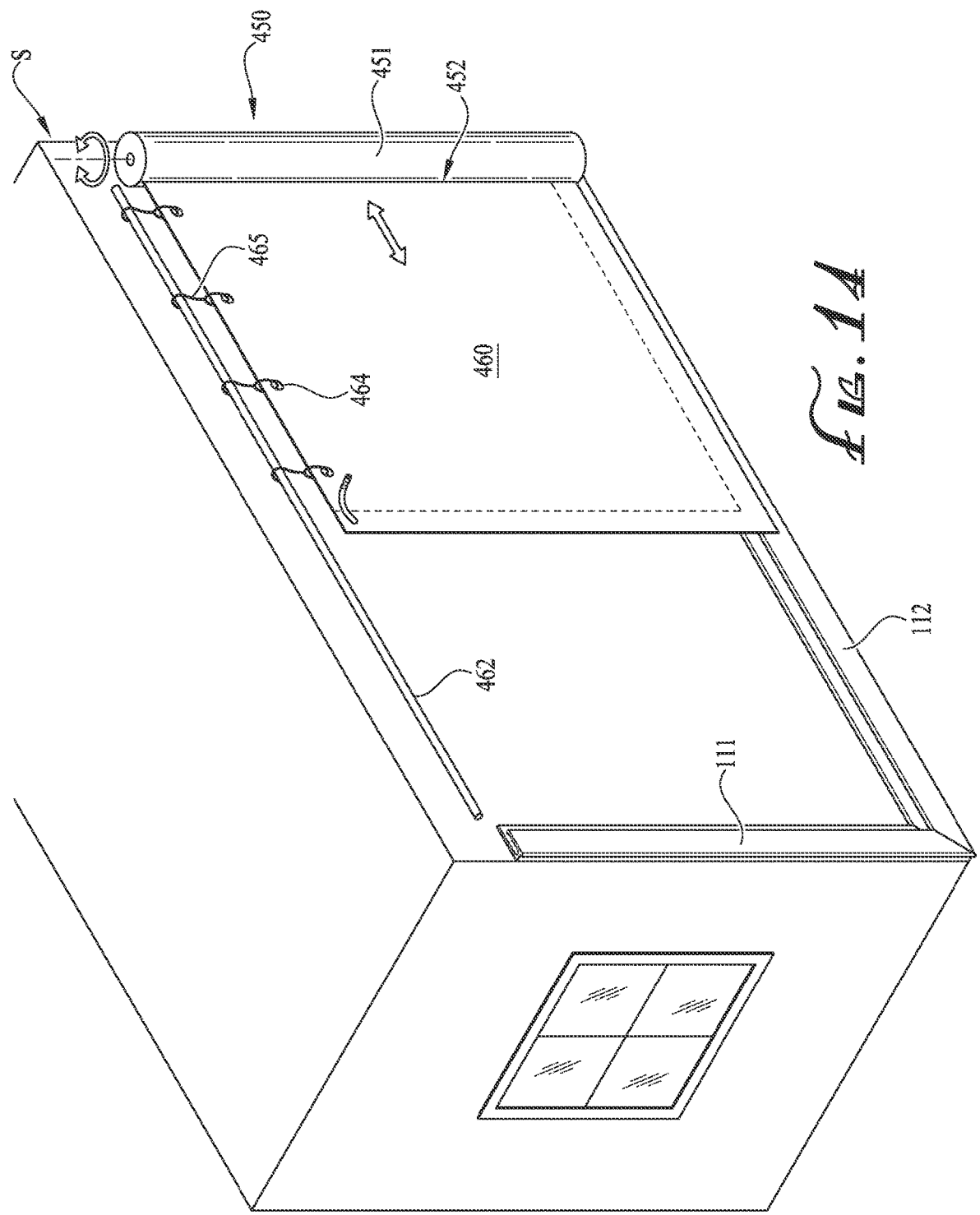
FIG. 14 shows a barrier panel storage and deployment system according to yet another example embodiment of the present invention.

FIG. 14 shows an upright or vertical storage system 450 used to assist the user during deployment of the barrier system described herein. The vertical storage system 450 comprises a housing or casing 451, the housing 451 comprising a top first end and a bottom second end, and a spool (not shown) secured inside the casing and configured to rotate about its axial axis therein. The casing 451 further comprises an opening or slot 452 extending longitudinally along the exterior surface of the casing 451.

According to example embodiments, the vertical storage system 450 is used with a barrier panel 460 having a top edge, a first side edge, a second side edge, and a bottom edge. The edges may be hemmed and tubed as described herein. In example embodiments, the first side edge of the barrier panel 460 is detachably attached to the spool. The rest of the barrier panel is wrapped around the spool inside the casing 451 and stored away when the panel is not in use. When the barrier panel is needed, the second, unsecured side edge of the barrier panel is accessed through opening 452 and pulled out of the casing 451, as shown in FIG. 14. In example embodiments, vertical storage system 450 may further comprise a handle (not shown) extending from the spool and extending out of the bottom and/or top ends of casing 451. The handle is used by the user to rotate the spool and reel barrier panel in and out of casing 451.

In some embodiments, panel storage receptacle may be provided with or without a spool therein. In other embodiments, the storage receptacle may be portable for temporary attachment or configured for being permanently fixed to the structure's exterior. Generally, the barrier panel is unpacked or unrolled from the storage casing as needed and secured to the structure as previously described herein. When the barrier system is not in use, the barrier panel may be rolled or packed into the storage unit until needed. In some example embodiments, the vertical storage system may further comprise a mechanism for assisting or biasing the rotation of the spool, such as for example, a motor, a coil spring, a power spring, or constant force spring.

In example modes of use, vertical storage system 450 is secured or otherwise held against a first side of an exterior wall of a structure, as shown in FIG. 14. The casing 451 is generally aligned against the wall such that the top edge of the panel 460 is aligned properly under the top support rod or track 462. When needed, the user pulls on an exposed side edge of the barrier panel 460 away from the casing 451 and towards the other second side of the exterior wall opposite the first side. As the barrier panel is drawn to the other side, the top edge of the panel is secured or otherwise mounted to the top track or rod 462 as described herein. In some example modes, the user may wait to secure the top edge of the barrier panel to the top track or rod until the barrier panel is fully drawn. Once fully drawn, the barrier panel 460 is secured and sealed to the exterior wall using a plurality of seal extrusions as previously described herein. The casing 451 may be removed and stored elsewhere until needed. When the barrier system is no longer needed, the barrier panels are detached from the seals as described herein. The vertical storage system is again secured to the structure adjacent to the suspended barrier panel and aligned thereto. The first side edge of the barrier panel is detachably secured to the spool inside casing 451. The user then reels the barrier panel back into the casing 451 by rotating the external handle attached to the spool. As the spool is rotated about its axial axis, barrier panel 460 is reeled and wrapped around the spool encased within casing 451. In some example embodiments, the dispensing and reeling in of the barrier panel may be assisted by a motor or spring operably connected to the spool.

Figure 15:
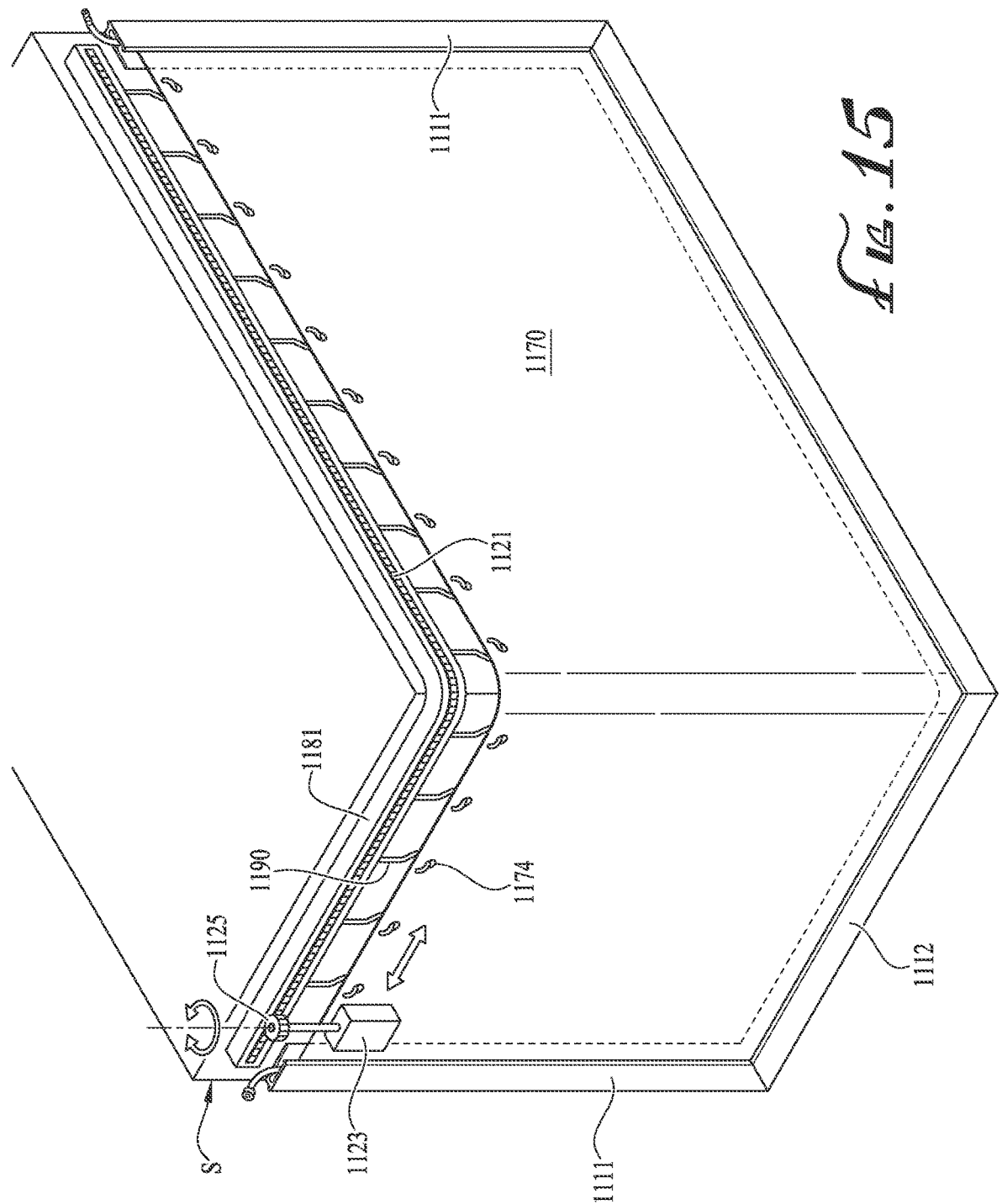
FIG. 15 shows a motorized track and panel system for moving a continuous barrier panel across one or more exterior walls of a structure according to another example embodiment of the present invention.

FIG. 15 shows a motorized top track and barrier panel system comprising a top track or rail 1181 with an exterior drive belt or track 1121, a plurality of roller hooks or shackles 1190, a barrier panel 1170 with grommets 1174, and a motor 1123 with a shaft gear 1125. According to example embodiments of the present invention, the motorized track and panel system is used to automate or motorize the movement of the barrier panel across the top track 1181 and the structure's exterior walls. Generally, top track 1181 comprises a hollow profile with internal tracks configured for moving rollers therein, for example, as shown in FIGS. 1-1A. The rollers comprise hooks or shackles 1190 attached thereto wherein hooks 1190 are configured for securing barrier panel 1190 thereon through grommets 1174. Alternatively, barrier panel 1170 may be suspended from the top track 1181 using alternative methods described herein.

In example embodiments, a single top track 1181 spans across more than one exterior wall of a structure, as shown in FIG. 15. Accordingly, top tracks 1181 may comprise rounded corners, or be generally contoured, to accommodate the structure's corners and other features. Rounded corners and contours ensure smooth, uninterrupted operation of the motorized top track and barrier panel system as described herein. In example embodiments, top track 1181 is formed from extruded or molded aluminum. However, top track 1181 may also be formed from other materials, including plastics, composites, metals, natural materials, synthetic materials, or any combination thereof, and by other applicable manufacturing processes Drive belt 1121 is a timing belt or a toothed belt configured for engagement with the shaft gear 1125 of motor 1123. Drive belt 1121 is generally secured to the exterior of the top track 1181 and aligned with the teeth of the shaft gear 1125 of motor 1123. In example embodiments, drive belt 1121 is formed from synthetic rubber and fixed to the top track using double-sided tapes and rivets. In other embodiments, drive belt 1121 may be formed from other materials, such as for example, natural and other rubbers, natural and synthetic plastics, metals, composites, or any combination thereof, and attached to the top track 1181 by other attachment means, such as for example, adhesives, fasteners, welds, or any combination thereof. In some embodiments, the drive belt may be integrally formed on the exterior of the top track 1181.

Generally, motor 1123 comprises a gear head 1125 secured to or formed on the end of the motor's drive shaft, the gear head 1125 having teeth configured to engage the teeth of the drive belt 1121. Motor 1123 is typically attached at the corner of the top edge and a leading side edge of barrier panel 1170 and arranged such that the gear 1125 properly aligns with drive belt 1121 when attached to the barrier panel 1170. In example embodiments, motor 1123 is permanently fixed to the barrier panel using adhesives. Alternatively, motor 1123 may be fastened to the barrier 1170 using other permanent or temporary attachment means, such as for example, screws or bolts, clasps or clips, hook-and-loop fasteners, tapes, or any combination thereof. In some example embodiments, a pocket may be provided on the barrier panel to insert and retain the motor 1123. The drive shaft of the motor may be adjusted to ensure proper engagement between the drive belt 1181 and motor gear 1125.

In example embodiments, motor 1123 is battery-powered and/or remotely operated with a remote transmitter or controller. In some example embodiments, motor 1123 may comprise a photovoltaic system to charge the battery and/or power the motor. In other example embodiments, motor 1123 may further comprise a port or connector to receive power from an external power source, such as for example, an external battery, a generator, or an electrical outlet.

According to example modes of use, operation of the motor 1123 and gear head 1125 are controlled by the user with a remote controller or transmitter. Generally, the rotational motion of motor gear head 1125 against the drive belt 1121 is converted into translational motion of the barrier panel 1170. In other words, the translational motion of the barrier panel is controlled by the rotation of the gear head 1125 against and relative to the stationary drive belt 1121. More specifically, as the gear head 1125 rotates, teeth around the gear engage the corresponding teeth on the stationary drive belt and the gear rotates along the drive belt. To move the leading side edge of the barrier panel forward, and thereby extend the barrier panel, motor 1123 is operated to rotate the drive shaft and gear head 1125 in the clockwise direction (in the shaft end perspective). On the other hand, to move the leading side edge of the barrier panel in reverse, and thereby retract the barrier panel, the motor drive shaft and gear head 1125 are rotated in the counter-clockwise direction (in the shaft end perspective).

According to example embodiments of the present invention, the single-sided seals described herein typically measure about 1.5-2 inches wide and about 0.5-1 inches tall, and more preferably about 1.75 inches wide and 0.67-0.75 inches tall. The double-sided flat seal extrusions are generally about 3-4 inches wide and about 0.5-1 inches tall, and more preferably about 3.5 inches wide and 0.67-0.75 inches tall. However, in other example embodiments, the single- and double-sided seals may be smaller or larger to accommodate the needs of the application, such as for example, working with restricted or confined spaces along a wall or accommodating for greater stresses and loads exerted on the seals.

In example embodiments, epoxy or other sealants may be applied between the structure's exterior and barrier seals or seal assemblies of example embodiments described herein. Epoxy and other sealants may provide improved adhesion and seal between the seals or seal assemblies and the structure's exterior. In other example embodiments, seals may further comprise channels, for example such as channels 229 as shown in FIG. 5 and channels 636 and 638 as shown in FIG. 10, on the surface which mates with the exterior surface of a structure. T-channels, for example such as channel 229 of FIG. 5 and channel 636 of FIG. 10, can provide better adhesion as epoxy and/or other sealants act as anchors once the sealant solidifies.

In some embodiments, plugs or stickers may be applied over any mounting holes or threaded bores on the surface of the seals that communicate with the structure's exterior surface. The plugs and/or stickers prevent epoxy or other sealants from infiltrating the threaded bores and interfering with the proper engagement of the threaded bolts and bores. In other embodiments, plugs or stickers are used to cover the threaded bores or openings on the mating surface between the male and female seals when the barrier system is not in use to prevent inadvertent collection of moisture or liquid.

In some example embodiments, rubber washers and/or caulk may be further incorporated around the mounting points, such as for example mounting holes 113 as shown in FIGS. 1 and 3, mounting holes 223 and 233 as shown in FIGS. 4-6, mounting holes 413 as shown in FIG. 8 and mounting holes 513 as shown in FIG. 9, providing greater seal functionality. Teflon tape, or like material, may be used along with threaded fasteners to further prevent leaks. However, it will be understood by one of ordinary skill in the art that a variety of other methods may be used to mount the barrier seals described herein to appropriate mounting surfaces and create proper seals to prevent fluid infiltration.

In further embodiments, a flame-retardant material may be applied to the exterior of the barrier panels, for example to prevent or reduce damage to the structure by wildfires. For example, a fireproof material such as DC315 Thermal and Ignition Barrier (International Fireproof Technology, Inc. of Irvine, CA); Firepoint fire retardant overlay (Arclin USA, LLC of Roswell, GA); and/or FlameOFF fire barrier intumescent paint (FlameOFF Coatings, Inc. of Raleigh, NC) may be applied to the barrier system to provide fire resistance. In another embodiment, barrier panels may comprise an aluminum coating, or coating of other similar material or characteristics, to increase resistance to damage from heat.

According to other example embodiments, the barrier panels may further comprise aircraft cables as reinforcement. The aircraft cables may be embedded within or attached externally to the barrier panels. In other embodiments, the barrier panels may be reinforced with carbon fiber cables, copper wires, aluminum wire meshes, and/or combinations of cables, wires, meshes, or plates of other natural and/or synthetic materials.

In other example embodiments, a pump is utilized to remove any inadvertent collection of water inside of the barrier system. In still another example embodiment, the edge seals can be mounted at various locations and angles to route such collection of water to desired areas for removal. In further example embodiments, foam or sodium bentonite may be used to seal the barrier layer in the ground area during back filling to prevent water from wicking back up the barrier to the side of the barrier closer to the protected structure.

In other example embodiments, the barrier system may be configured such that the overall height of the system is less than the height of the protected structure's exterior walls. The barrier system may be limited to a desirable height, for example between four and six feet, to protect a structure from minor floods without strong winds or other more damaging threats. In example embodiments wherein the barrier system is limited to a height less than the overall height of the exterior wall, or wherein the barrier system is not secured immediately under a soffit or eave, a temporary or permanent panel edge cover or splash guard 490 can be provided to cover the top edge of the barrier panel and/or prevent any water from trespassing the barrier system over the top edge, as shown in FIG. 7. In the depicted embodiment, splash guard 490 comprises a generally Z-shaped profile formed from extruded aluminum and secured to the structure using bolts B, as shown in FIG. 7. However, in other example embodiments, splash guard 490 comprising other profiles may be secured to the structure by other applicable attachment means, such as for example, adhesives, fasteners, and/or hooks or clasps or any combination thereof. In some example embodiments, for example, the splash guard 490 may comprise an inverted V-shaped or a L-shaped profile. In still other example embodiments, the splash guard 490 may be formed from other materials, including plastics, composites, metals, natural materials, synthetic materials, and/or combination thereof, and by other applicable manufacturing processes. Epoxy or other sealants may also be applied between the structure's exterior and the splash guard to provide better adhesion and seal therebetween.

In example modes of use, methods of preventing damage to a structure include the application of one or more components as disclosed herein. One or more support and attachment components are attached to the structure, for example including one or more top tracks, shackles, barrier seals, barrier panels, anchors, and/or barrier panel storage unit. One or more barrier panels or sheets of waterproof or water-resistant barrier material are mounted to the support and attachment components. Optionally, the barrier material may be fire-resistant. Waterproof or water-resistant sealing engagement is optionally applied between the sheets or panels of barrier material and the structure, for example around the exterior perimeter of the structure via the support and attachment components, embedment below grade, adhesive sealants, and/or other sealing means. Optionally, the system is selectively applied or deployed in an emergency event such as imminent flooding, storms, high winds, wildfire, or the like; and may optionally be removed or stored when not in use. In the event of flooding, flood water ingress into the structure is prevented or substantially reduced by the barrier material being pressed around and against the structure by the force of the water, sealing potential points of entry against water passage. In the event of high winds and/or flying debris, the barrier material prevents or reduces damage to siding, windows and other parts of the structure. In the event of a wildfire, the barrier material prevents or reduces flame migration and combustible heat transfer to the structure.

While the invention has been described with reference to example embodiments, it will be understood by those skilled in the art that a variety of modifications, additions and deletions are within the scope of the invention, as defined by the following claims.

What is claimed is:

1. A barrier system, comprising:
a barrier panel, wherein the barrier panel comprises at least one edge with more than one end portions, and
a barrier seal comprising more than one channel, wherein each channel is configured or receiving one end portion of the barrier panel; and
wherein the barrier panel further comprises an expandable tubing between the end portions of the at least one edge.

2. The barrier system of claim 1, wherein at least one of the end portions comprises an insert embedded therein.

3. The barrier system of claim 2, wherein the insert is made from a flexible material.

4. The barrier system of claim 2, wherein the barrier comprises at least one edge with two end portions.

5. The barrier system of claim 4, wherein the barrier seal comprises two channels, wherein the two channels are configured for receiving the two end portions of the barrier panel.

6. The barrier system of claim 1, wherein the barrier seal comprises a plurality of mounting holes.

7. The barrier system of claim 6, wherein the mounting holes are counter-sunk to prevent abrasion of the tubing.

8. The system of claim 1, further comprising a top track for suspending the barrier panel therefrom.

9. The system of claim 8, further comprising a barrier panel storage unit for storing the barrier panel.

10. A system for protecting a structure, the system comprising a barrier panel and at least one barrier seal, wherein the barrier panel comprises at least one edge with split end portions and an inflatable tubing between the split end portions and wherein the at least one barrier seal is configured to receive the at least one edge of the barrier panel and create a water-tight seal between the barrier panel and the at least one barrier seal when the tubing is inflated.

11. The system of claim 10, wherein the at least one barrier seal comprises channels for receiving the split end portions of the barrier panel.

12. The system of claim 11, wherein the split end portions comprise flexible material embedded therein.

13. The system of claim 12, wherein the at least one barrier seal further comprises a plurality of spaced apart mounting holes for affixing the at least one barrier seal to the structure.

14. The system of claim 10, wherein the barrier panel comprises more than one edge with split end portions.

15. The system of claim 14, wherein the system comprises a barrier seal for each edge of the barrier panel with split end portions.

16. The system of claim 10, wherein the split end portions comprise keder material embedded therein.

17. A protection system, comprising at least one barrier panel comprising at least one edge with a plurality of end portions and an inflatable tubing between the end portions; and at least one barrier seal configured for receiving the at least one edge of the at least one barrier panel.

18. The protection system of claim 17, wherein the end portions comprise a flexible material embedded therein and extending along a length of the at least one edge.

\* \* \* \* \*